(12) United States Patent
Henze

(10) Patent No.: US 7,875,386 B2
(45) Date of Patent: Jan. 25, 2011

(54) ENERGY CONVERTER CELL FOR THE DIRECT CONVERSION OF RADIATION AND/OR THERMAL ENERGY INTO ELECTRICAL ENERGY

(76) Inventor: Werner Henze, Uhlenkamp 9, 30916 Isernhagen (DE)

( * ) Notice: Subject to any disclaimer, the term of this patent is extended or adjusted under 35 U.S.C. 154(b) by 696 days.

(21) Appl. No.: 11/920,809

(22) PCT Filed: Feb. 17, 2006

(86) PCT No.: PCT/DE2006/000301

§ 371 (c)(1),
(2), (4) Date: Nov. 20, 2007

(87) PCT Pub. No.: WO2006/128406

PCT Pub. Date: Dec. 7, 2006

(65) Prior Publication Data

US 2008/0152999 A1 Jun. 26, 2008

(30) Foreign Application Priority Data

May 30, 2005 (DE) .................. 10 2005 025 028

(51) Int. Cl.
*H01M 6/04* (2006.01)
*H01M 10/26* (2006.01)

(52) U.S. Cl. .................. 429/207; 429/188; 429/202; 429/206; 429/224

(58) Field of Classification Search ................ 429/188, 429/202, 206, 207, 218.1, 218.2, 220, 221, 429/222, 224, 225, 231.4, 231.8

See application file for complete search history.

(56) References Cited

U.S. PATENT DOCUMENTS 3,026,364 A 3/1962 Jackson et al

FOREIGN PATENT DOCUMENTS

| DE | 205 089 C | 7/1905 |
| DE | 2 262 935 | 12/1973 |
| DE | 29 28 708 | 2/1980 |
| GB | 1360 589 | 7/1974 |
| GB | 1 482 621 A | 8/1977 |
| GB | 2 109 985 A | 6/1983 |
| WO | WO 2004/015794 A | 2/2004 |

OTHER PUBLICATIONS

International Search Report, Dec. 2007.

*Primary Examiner*—Jennifer K. Michener
*Assistant Examiner*—Carlos Barcena
(74) *Attorney, Agent, or Firm*—Collard & Roe, P.C.

(57) ABSTRACT

The invention relates to an energy converter cell, consisting of a negative metal electrode, preferably a tin electrode, a positive electrode consisting of graphite and an electrolyte that is positioned between the electrodes and is in contact with the latter, the electrolyte containing in the charged state a manganate(IV) salt that is dissolved in water and an alkali hydroxide. The energy converter cell forms a galvanic element, which can be discharged by delivering electrical energy to an ohmic consumer resistor that is connected to the electrodes and can be charged by a supply of thermal energy. In addition, supplied electrical energy can be electrochemically stored in the cell.

15 Claims, 2 Drawing Sheets

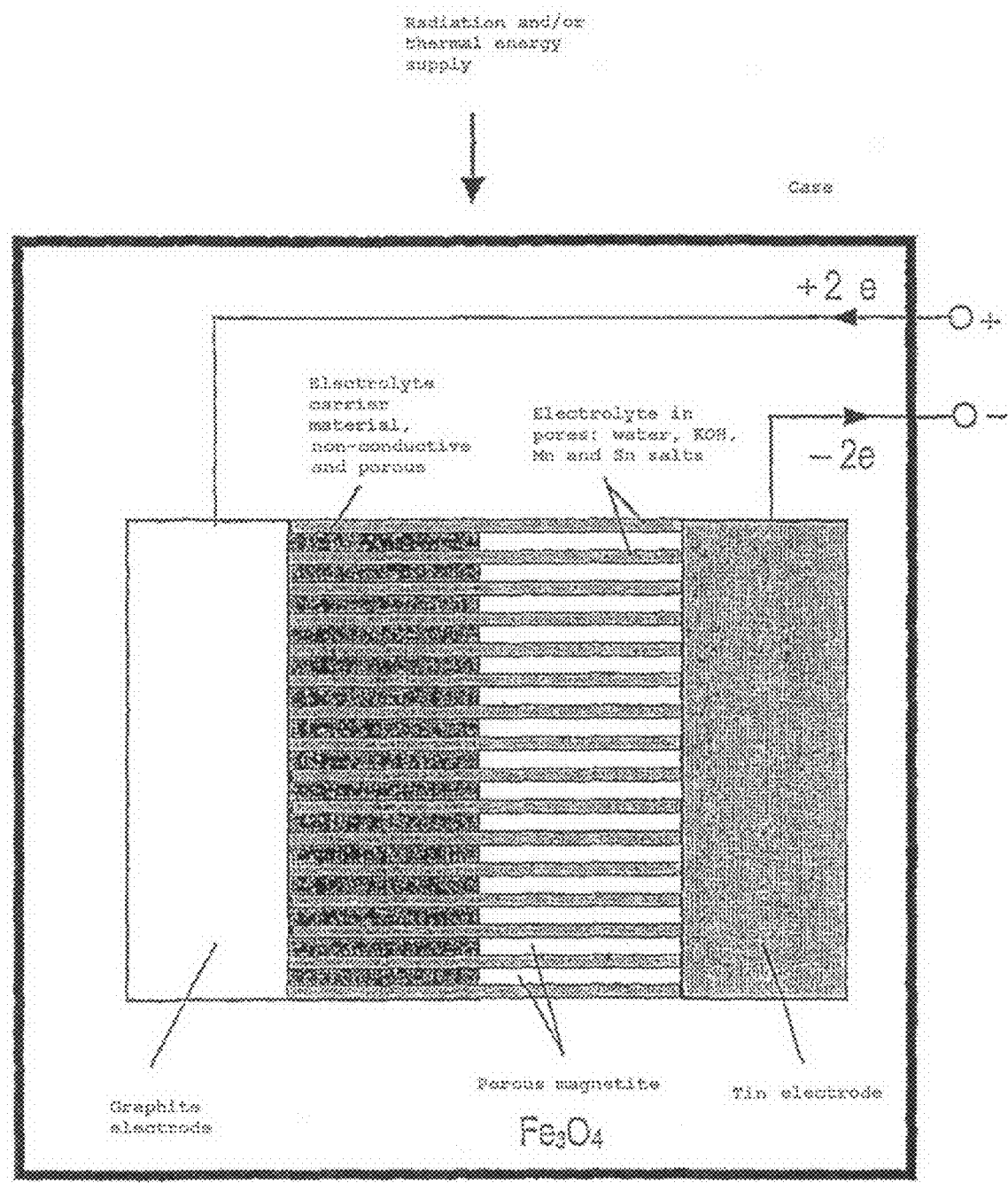

ENERGY CONVERTER CELL FOR THE DIRECT CONVERSION OF RADIATION AND/OR THERMAL ENERGY INTO ELECTRICAL ENERGY

CROSS REFERENCE TO RELATED APPLICATIONS

Applicant claims priority under 35 U.S.C. §119 of German Application No. 10 2005 025 028.9 filed May 30, 2005. Applicant also claims priority under 35 U.S.C. §365 of PCT/DE2006/000301 filed Feb. 17, 2006. The international application under PCT article 21(2) was not published in English.

During the discharge of galvanic elements—primary batteries or storage batteries—with aqueous electrolytes, the metal from which the negative electrode is made normally dissolves and as a result of the discharge of positively charged ions, atomic hydrogen occurs directly or through a reaction at the positive terminal. This hydrogen very quickly forms hydrogen molecules ($H_2$), if it does not react with any other substance beforehand. This effect results in a rapid increase in the cell's internal resistance, because the hydrogen gas formed at the positive terminal has an insulating effect. There are processes and methods of reducing hydrogen to water, e.g. the following possible reactions could occur at the positive electrode:

$PB^{4+}O_2 + 2H^+ + 2\ e \rightarrow Pb^{2+}O + H_2O$ in a lead-acid battery $2Ni^{3+}O(OH) + 2H^+ + 2\ e \rightarrow 2Ni^{2+}O + 2H_2O$ in a nickel-iron battery $2Mn^{4+}O_2 + 2H^+ + 2\ e \rightarrow Mn_2^{3+}O_3 + H_2O$ in an alkaline manganese battery This means that an end product always occurs at the positive terminal, which in the case of storage batteries can only be reconverted electrically. The negative electrode also behaves similarly. In this case, the following substances are produced during the discharging process:

$Pb + [SO4]^{2-} - 2\ e \rightarrow PbSO_4$ in a lead-acid battery $Fe + 2(OH)^- - 2\ e \rightarrow Fe(OH)_2$ in a nickel-iron battery $Zn + 2Cl^- 2\ e \rightarrow ZnCl_2$ in an alkaline manganese battery The object of the invention is to prevent any end products from occurring by supplying thermal energy. To achieve this, the atomic hydrogen created at the positive terminal must react with the electrolytes, giving rise to a soluble substance with which the salt formed at the negative terminal can react. This reaction, which only takes place with a supply of thermal energy, must again provide the necessary raw materials. It is important for the hydrogen that is created to be available at the correct place in atomic or ionic form for reduction of the tin.

There are salts of a non-existent "manganic" acid $H_2MnO_3$. These include the salt produced from manganese dioxide and potassium hydroxide.

$MnO_2 + 2KOH \rightarrow K_2[MnO_3] + H_2O$

The electrolyte consists of water in which the salt $K_2[MnO_3]$ and potassium hydroxide are dissolved. Once the cell has started to operate, a stannate (II) salt $K[Sn(OH)_3]$ is also partially dissolved. A distinction is then made between the electrochemical reactions and the chemical recycling reactions, which facilitate regeneration of the starting substances. The positive electrode is made from a graphite film and the negative one from tin. The two starting materials $K_2[MnO_3]$ and tin must be regenerated from the electrochemically created products during electrical loading of the cells, in order to guarantee a cycle. When current flows across an external consumer resistor, the following reactions take place:

1. Electrochemical reaction at the positive terminal (reduction):

$2K^+ + 2e \rightarrow 2K$ $2K + 2H_2O \rightarrow 2KOH + 2H$

Once the $K^+$ ions have been discharged, the K atoms can react with water or also be stored in the crystal lattice of the graphite electrode. Apart from this effect, graphite can also absorb the resulting atomic hydrogen into its crystal lattice, so that it is available to react with the electrolyte in its active form. The graphite electrode is preferably porous, so that the surface of the graphite electrode is as large as possible. The graphite electrode should therefore preferably be made from a compressed graphite powder. Hydrogen itself is practically insoluble in water. A reaction between the hydrogen and atmospheric oxygen is scarcely possible, because the graphite electrode is porous and contains liquid electrolyte.

2. Recycling reaction at the positive terminal (reduction):

$K_2[MnO_3] + H_2O + 2H \rightarrow K_2[Mn(OH)_4]$

This involves the valency stage of the manganese being reduced from +4 to +2.

3. Electrochemical reaction at the negative terminal (oxidation):

$[MnO_3]^{2-} - 2\ e + 2KOH + Sn \rightarrow Sn(OH)_2 + K_2[MnO_3]$

Tin hydroxide is produced and once again a starting substance, namely the salt $K_2[MnO_3]$.

4. Recycling reactions at the negative terminal (reduction):

$Sn(OH)_2 + KOH \rightarrow K[Sn(OH)_3]$

The hydroxomanganate(II) $K_2[Mn(OH)_4]$ produced at the positive terminal reacts with the stannate (II) $K[Sn(OH)_3]$ with a supply of thermal energy:

$K_2[Mn(OH)_4] + K[Sn(OH)_3] \rightarrow K_2[MnO_3] + KOH + 3H_2O + Sn$

Only when this reaction takes place is water reformed and tin returned to its elementary state. Furthermore, the salt $K_2[MnO_3]$ required at the positive terminal for the absorption of hydrogen is once again available and the manganese returns from the 2-valency to the 4-valency stage. This reaction thereby completes the hydrogen and tin cycle.

It can be seen from the simplified reaction equation below that in order to obtain electrical energy, the left side of the equation produces the right side and the converse case is possible with a supply of energy.

$Sn + 2\ H_2O \leftrightarrow Sn(OH)_2 + 2\ H + 16.7\ kJ$

It should also be noted that 2-valency tin easily transforms into the 4-valency stage when heated.

$2K[Sn(OH)_3] \rightarrow K_2[Sn(OH)_6] + Sn$

However, with the hydroxomanganate (II) $K_2[Mn(OH)_4]$ the tin in the compound $K_2[Sn(OH)_6]$ is converted into its elementary state.

$K_2[Sn(OH)_6] + 2K_2[Mn(OH)_4] \rightarrow 2K_2[MnO_3] + 2\ KOH + 6\ H_2O + Sn$ The stannate (II) $K[Sn(OH)_3]$ also occurs in an anhydrous state, i.e. it can be dehydrated.

$2\ K[Sn(OH)_3] \rightarrow K_2Sn_2O_3 + 3\ H_2O$

The compound $K_2Sn_2O_3$ can also be reduced to tin:

$2\ K_2[Mn(OH)_4] + K_2Sn_2O_3 \rightarrow 2\ K_2[MnO_3] + 2\ KOH + 3H_2O + 2\ Sn$ The molar free standard enthalpy for $Sn(OH)_2$ is $\Delta G=-491.1$ kJ/mol. Consequently, the cell's no-load voltage must be 1.33 V. The maximum measurement was 1.26 V at 25° C. The conversion of thermal energy into electrical energy already takes place at room temperature (20° C.). It rises exponentially with the temperature increase.

BRIEF DESCRIPTION OF THE DRAWINGS

The invention will be explained below with reference to the drawings. In the drawings, FIG. 2 shows the internal design of the energy converter cell according to the invention.

DETAILED DESCRIPTION OF THE EMBODIMENTS

Figure 1:
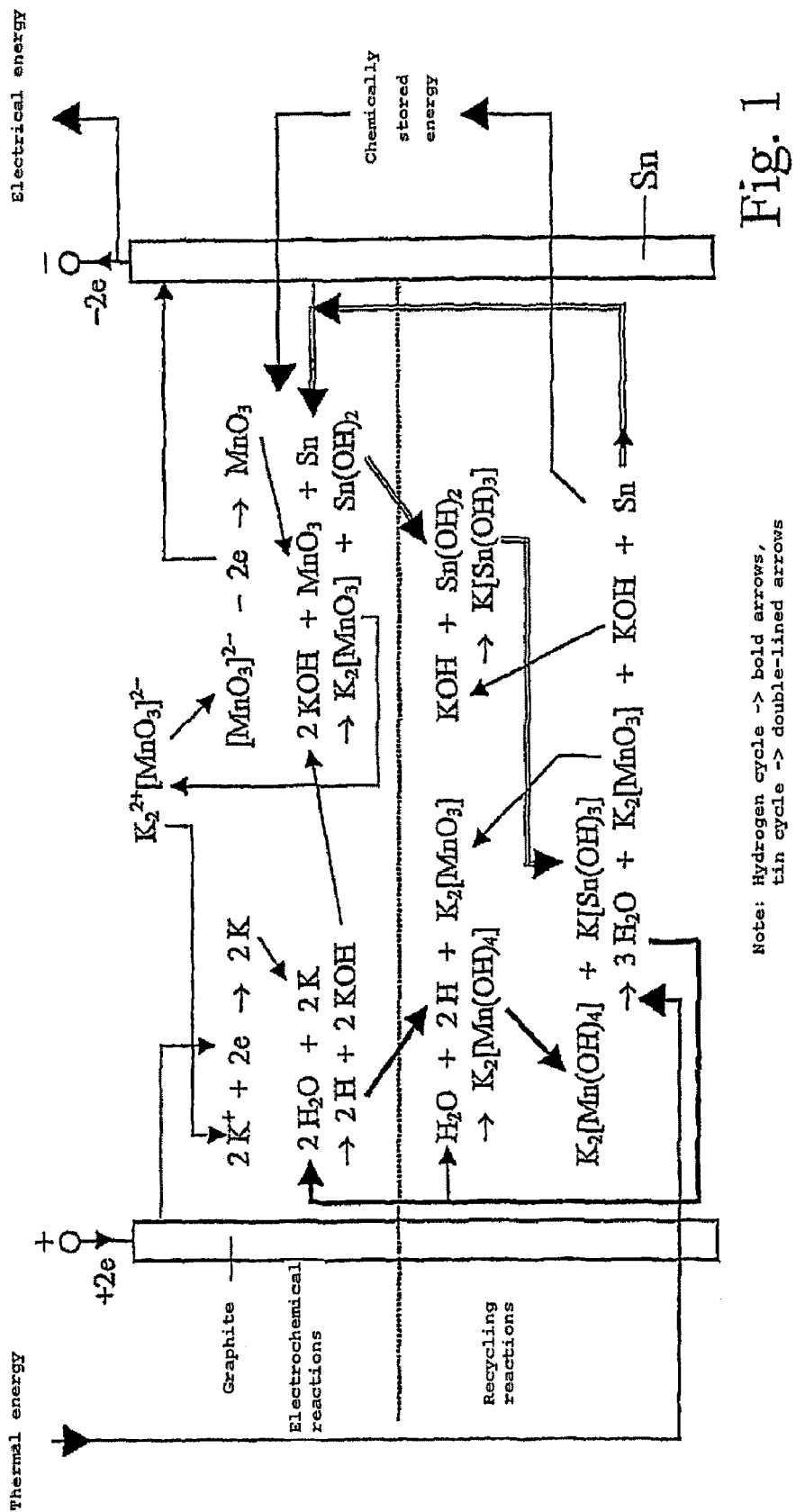
FIG. 1 shows a block diagram of the functional processes of the energy converter cell according to the invention.

The functional processes of the energy converter cell are illustrated in FIG. 1. The arrows between the reaction equations, which are printed in bold, indicate the hydrogen transportation, which is in a cycle, and similarly to this, the double-lined arrows indicate the tin cycle. In addition, there is a dotted dividing line running between the electrochemical reactions and the recycling reactions, in which depolarisation of the positive electrode takes place and regeneration of the starting substances is effected. It further illustrates how thermal energy brings about the reduction of chemical substances, which are then once again available for electrical energy production.

Reuse of the Regenerated Elementary Tin

The regenerated tin, which is created from the reaction between the hydroxomanganate (II) $2K_2[Mn(OH)_4]$ and the stannate (II) $K[Sn(OH)_3]$ has no electrical contact with the negative tin electrode. Furthermore, it reacts with water in the existing finely distributed form and at increased temperatures.

$$Sn + H_2O \rightarrow SnO + 2 H + 19.1 \text{ kJ}$$

Hydrogen is produced and also tin hydroxide based on the following reaction $$SnO + H_2O \rightarrow Sn(OH)_2$$

Stannate (II) is once again produced with potassium hydroxide $$Sn(OH)_2 + KOH \rightarrow K[Sn(OH)_3]$$

The salt $K[Sn(OH)_3]$ is absorbed by the electrolyte and the hydrogen reaches magnetite particles ($Fe_3O_4$), which are in electrical contact with the negative electrode.

The cell's internal design is shown in section in FIG. 2. Adjacent to the positive electrode is a thin layer, which comprises a porous, non-electrically conductive and water-absorbable carrier material, in which liquid electrolyte can be found. The material may comprise cotton fibres, for example. These are also used in the zinc air primary battery to absorb 40% caustic potash solution.

Between the electrolyte-bearing, only ionically conductive layer and the negative electrode made from tin, there is a porous iron oxide layer ($Fe_3O_4$), which likewise contains liquid electrolyte. The iron (II, III) oxide is resistant to alkaline substances, electrically conductive and has the ability to absorb hydrogen atomically into its crystal lattice. Hydrogen only reacts with $Fe_3O_4$ at temperatures well in excess of the operating temperature of the energy converter cell, namely approx. 500° C.:

$$Fe_3O_4 + 4 H_2 \leftrightarrow 3 Fe + 4 H_2O$$

The hydrogen absorbed by the iron oxide $Fe_3O_4$ is evenly distributed in the oxide's crystal lattice and reaches the inside of the negative tin electrode. It reacts there and also on the surface of the iron oxide electrochemically with negatively charged ions, by delivering electrons to the negative electrode. Because the liquid electrolyte is also subject to thermal currents, all the hydrogen occurring in the electrolyte reaches the surface of the iron oxide and the inside of the negative electrode. Using iron oxide ($Fe_3O_4$) significantly increases the surface of the negative electrode and the regenerated tin or else the resulting hydrogen can be detected depending on the thermal movement of the liquid electrolyte. The negative electrode is therefore partly a tin and partly a hydrogen electrode.

It has emerged that the effectiveness of the energy converter cell can also be increased by locating a porous mixture of iron oxide ($Fe_3O_4$) and tin (Sn), particularly in the form of a powder mixture, between the electrolyte-bearing, only ionically conductive layer and the negative electrode made from tin, which likewise contains liquid electrolyte. The tin (Sn) firstly increases conductivity and secondly also the surface of the aforementioned layer required for absorption and adsorption processes.

Instead of tin, the aforementioned mixture can also be produced using other endothermic metals giving the same effect, particularly zinc or chromium.

Equilibrium Condition between Electrical Load and Thermal Energy Supply

If the electrical load is too high relative to the energy conversion capacity and the operating temperature of the energy converter cell, the electrolyte cannot absorb all the hydrogen produced at the positive electrode. Hydrogen molecules ($H_2$) occur there, causing the cell's internal resistance to rise. Moreover, the proportion of water in the electrolyte falls and more stannate (II) salt is formed, with which water-soluble potassium hydroxide is also combined.

If the operating temperature is higher than required by the electrical load, the cell's terminal voltage also increases. No-load running is usually harmless and promotes the reduction of the products created under the previous electrical load; however, hydrogen can be developed at the negative electrode at an excessively high operating temperature, $$Sn + 4 H_2O + 2 KOH \rightarrow K_2[Sn(OH)_6] = 2 H_2$$

whereby hydrogen molecules are likewise created and water consumed. It is also advisable to adjust the thermal energy supply to the electric load or vice versa, which can easily be achieved using control circuits.

It is further advantageous if the cell does not contain any particularly environmentally harmful substances. Caustic potash is also used in alkaline manganese cells, for example.

The process can also be achieved using other metals. Possible examples include zinc, chromium, iron, cadmium, lead and copper.

Electrical Energy Storage with the Energy Converter Cell

Provided the cell contains tin salt, supplied electrical energy can be stored in the cell. Hydrogen is then produced at the negative terminal, which reduces existing tin salts to elementary tin.

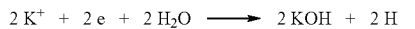

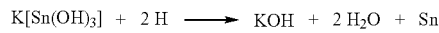

Oxygen is first produced at the positive terminal, which then raises the valency stage of the manganese from +4 to +6.

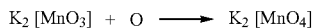

In the following reaction, the valency stage of the manganese is reduced from +6 to +4:

$K_2[MnO_4] + K_2[Mn(OH)_4] \rightarrow 2 K_2[MnO_3] + 2 H_2O$

Electrical energy can therefore also be stored to a limited extent in the cell.

The invention claimed is:

1. An energy converter cell, comprising a negative electrode made from a metal chosen from the group comprising tin, zinc, chromium, iron, cadmium, lead and copper (M), a porous iron oxide layer ($Fe_3O_4$) in contact with the negative electrode, a positive electrode comprising graphite and an electrolyte that is positioned between the electrodes and is in contact with the latter, the electrolyte containing in the charged state a manganate (IV) salt that is dissolved in water and an alkali metal (A) hydroxide and forms a galvanic element, said galvanic element being connected to an ohmic consumer resistor and a supply of thermal energy, the ohmic consumer resistor being further connected to the electrodes, wherein discharging the galvanic element by delivering electrical energy to an ohmic consumer resistor and charging by a supply of thermal energy are described by the following reactions:

Discharging:
a) electrochemical reaction at the positive electrode:

$2 A^+ + 2 e \rightarrow 2 A$ $2 A + 2 H_2O \rightarrow 2 AOH + 2 H$ b) electrochemical reaction at the negative electrode:

$[MnO_3]^{2-} - 2 e + 2 AOH + M \rightarrow M(OH)_2 + A_2[MnO_3]$

Charging:
c) recycling reaction at the positive electrode:

$A_2[MnO_3] + H_2O + 2 H \rightarrow A_2[Mn(OH)_4]$ d) recycling reaction at the positive electrode:

$M(OH)_2 + AOH \rightarrow A[M(OH)_3]$ $A_2[Mn(OH)_4] + A[M(OH)_3] + heat \rightarrow A_2[MnO_3] + AOH + 3 H_2O + M$ wherein A is an alkali metal and M is a metal chosen from the group comprising tin, zinc, chromium, iron, cadmium, lead and copper.

2. The energy converter cell according to claim 1, wherein the galvanic element can be charged alternatively or in addition while absorbing electrical energy from an energy source connected to the electrodes, wherein the charging is described by the following reactions:

Charging:
a) electrochemical reaction at the positive electrode:

$2[M(OH)_3]^- - 2 e + 2 AOH + A_2[Mn(OH)_4]$ $\rightarrow 2 A[M(OH)_3] + A_2[MnO_3] + 3 H_2O$ b) electrochemical reaction at the negative electrode:

$2 A^+ + 2 e + A[M(OH)_3] \rightarrow 3 AOH + M$.

3. The energy converter cell according to claim 1, wherein the alkali metal (A) is potassium.

4. The energy converter cell according to claim 1, wherein the metal (M) is tin.

5. The energy converter cell according to claim 1, wherein the positive electrode is a graphite film and/or is so porous that the positive electrode has as large a surface area as possible.

6. The energy converter cell according to claim 1, wherein at the side of the positive electrode facing the electrolyte is disposed a layer comprising a porous, non-electrically conductive and water-absorbable carrier material, wherein the porous iron oxide layer ($Fe_3O_4$) is formed between said layer and the negative electrode, said layer containing electrolyte.

7. The energy converter cell according to claim 6, wherein between the carrier material and the negative electrode, the porous iron oxide layer ($Fe_3O_4$) further comprises at least one other metal selected from tin (Sn), zinc (Zn), and chromium (Cr) or their salts forming an electrically conductive mixture, which likewise contains electrolyte.

8. The energy converter cell according to claim 6, wherein the carrier material comprises cotton fibres or the like and/or the layer is thinly formed from carrier material.

9. The energy converter cell according to claim 1, wherein the energy converter cell comprises or is connected with a control circuit to adjust the thermal energy supply to the electric load or the electric load to the thermal energy supply.

10. A method of converting chemical energy into electrical energy and thermal energy into chemical energy using an energy converter cell of claim 1 comprising discharging the galvanic element by delivering electrical energy to the ohmic consumer resistor that is connected to the electrodes and is charged by a supply of thermal energy, wherein the discharging and charging are described by the following reactions, in which to convert chemical energy into electrical energy a) at the positive electrode:

$2 A^+ + 2 e \rightarrow 2 A$ $2 A + 2 H_2O \rightarrow 2 AOH + 2 H$ and b) at the negative electrode:

$[MnO_3]^{2-} - 2 e + 2 AOH + M \rightarrow M(OH)_2 + A_2[MnO_3]$ are converted and to convert thermal energy into chemical energy c) at the positive electrode:

$A_2[MnO_3] + H_2O + 2 H \rightarrow A_2[Mn(OH)_4]$ and d) at the negative electrode:

$M(OH)_2 + AOH \rightarrow A[M(OH)_3]$ $$A_2[Mn(OH)_4]+A[M(OH)_3]+heat \rightarrow A_2[MnO_3]+ AOH+3\ H_2O+M$$

are converted, wherein A is an alkali metal and M is a metal chosen from the group comprising tin, zinc, chromium, iron, cadmium, lead and copper.

11. The method according to claim 10, wherein the galvanic elements is charged alternatively or in addition while absorbing electrical energy from an energy source connected to the electrodes, whereby to convert electrical energy into chemical energy a) at the positive electrode:

$$2[M(OH)_3]^- -2\ e+2\ AOH+A_2[Mn(OH)_4]$$
$$\rightarrow 2\ A[M(OH)_3]+A_2[MnO_3]+3\ H_2O$$

and b) at the negative electrode:

$$2\ A^+ +2\ e+A[M(OH)_3] \rightarrow 3\ AOH+M$$

are converted.

12. The method according to claim 10, wherein the manganate (IV) salt has a depolarizing effect at the positive electrode.

13. The method according to claim 10, wherein potassium hydroxide is used as the alkali metal hydroxide.

14. The energy converter cell according to claim 10, wherein tin is used as the metal (M).

15. The method according to claim 10, wherein during operation of the energy converter cell the thermal energy supply must be adjusted to the electrical load or the electrical load to the thermal energy supply.

* * * * *